Feb. 4, 1958  E. T. LORIG  2,822,077
BELT DRIVEN ROLLER CONVEYOR
Filed Nov. 8, 1954

INVENTOR.
EDWIN T. LORIG,
BY: Donald G. Dalton
his Attorney.

2,822,077

BELT DRIVEN ROLLER CONVEYOR

Edwin T. Lorig, Pittsburgh, Pa., assignor to United States Steel Corporation, a corporation of New Jersey Application November 8, 1954, Serial No. 467,269

2 Claims. (Cl. 198—127)

This invention relates to a roller conveyor and more particularly to such a conveyor in which the rollers are driven by means of a belt. Present roller conveyors of this type require side guides to prevent objects passing thereover from falling off the conveyor. Damage to the objects often results due to their contact with the guides. Also, in some cases, the objects become wedged between the guides. The conveyors are often made much wider than the width of the objects passing thereover because the objects do not remain centered or aligned thereon. Another disadvantage is that the drive belt does not track properly especially when the conveyor is reversible.

It is therefore an object of my invention to provide a belt driven roller conveyor which is reversible and which will keep objects centered thereon without the use of side guides.

Another object is to provide a conveyor in which the drive belt will track properly regardless of its direction of travel.

Figure 1:
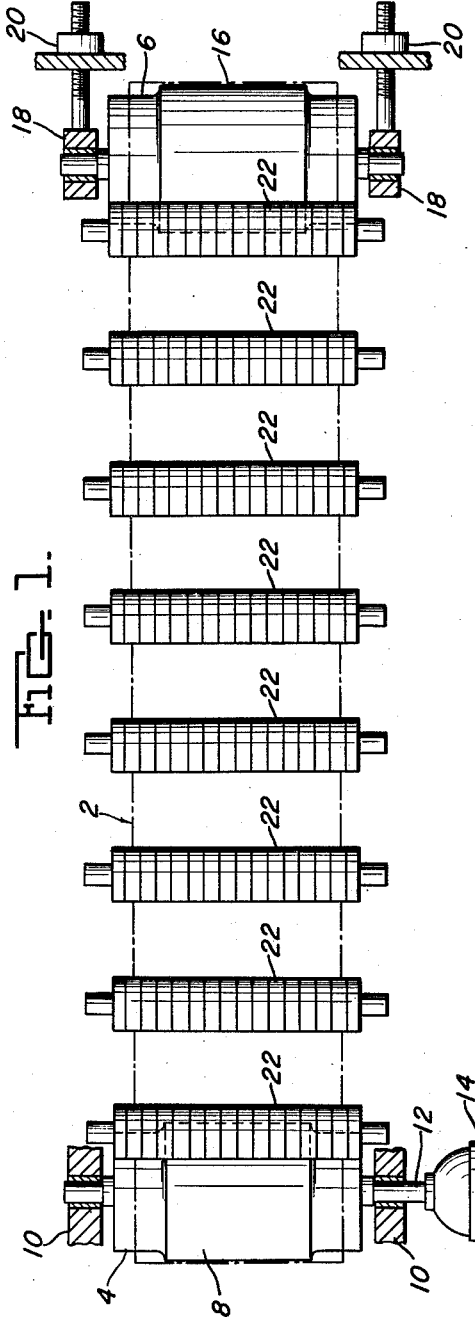
Figure 2:
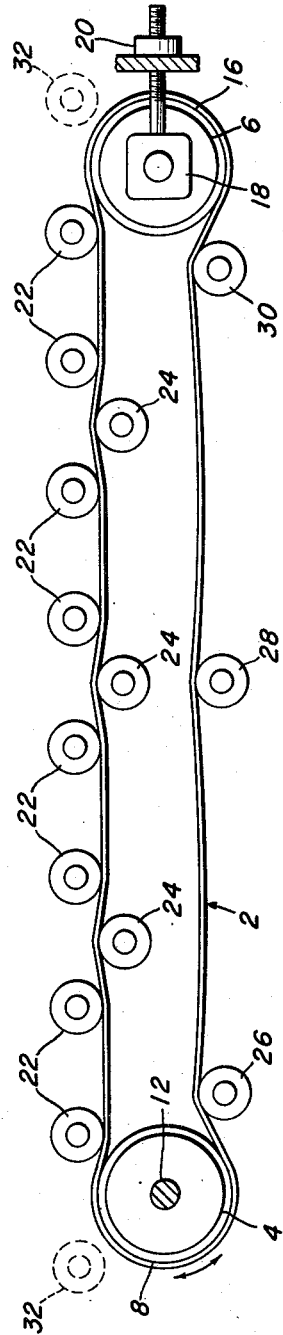

These and other objects will be more apparent after referring to the following specification and attached drawings, in which:

Figure 1 is a schematic plan view of a roller conveyor with certain parts shown in section and the bearings for the rolls of the roller conveyor omitted; and Figure 2 is a schematic end view of the conveyor of Figure 1 with the drive motor removed.

Referring more particularly to the drawings, the reference numeral 2 indicates an endless drive belt which is supported by head pulley 4 and tail pulley 6. The head pulley 4 has a cylindrical strip supporting surface 8 of substantially less width than the belt and is supported in bearings 10. The pulley 4 has a shaft extension 12 which is connected to a reversible drive motor 14. It will be understood that a speed change mechanism may be inserted between the shaft extension 12 and motor 14. Tail pulley 6 also has a cylindrical strip supporting surface 16 of considerable less width than the width of the belt and is supported in bearings 18. Screw take up mechanism 20 connected to the bearings 18 are provided to move the roll or pulley 6 toward and away from the roll or pulley 4. A plurality of self-centering rolls 22 are arranged in alignment with their axes substantially parallel to one another and with their lower portions in contact with the belt 2. All of the load supporting rolls 22 may be self-centering rolls of the type shown in my Patents Nos. 2,592,581 and 2,593,158, both dated April 15, 1952 or some of the rolls may be self-centering rolls and the others cylindrical rolls. The rolls of my patents have strip supporting surfaces on each side of a transverse central plane which under load will deflect inwardly toward the axis of the roll and toward the central plane. The strip supporting surfaces of rolls 22 may be either of greater or less width than the width of belt 2. As shown the rolls 22 are of the type shown in my Patent No. 2,592,581. A plurality of snubbing rolls 24 are arranged between the upper and lower runs of the belt between the load supporting rolls 22 with their upper portion being above the tangent extending between the load supporting rolls. These rolls may be cylindrical rolls having a strip supporting surface of full width. Rolls 26, 28 and 30 are arranged to bear against the lower run of the belt 2, as shown. These rolls must be self-centering rolls preferably of the type shown in my above mentioned Patent No. 2,592,581. The strip supporting surface of the rolls 26 and 30 are preferably slightly concave while the strip supporting surface of roll 28 is cylindrical. If the rolls 22 are of the type shown in my Patent No. 2,593,158 rolls 24 are preferably self-centering rolls of the type shown in my Patent No. 2,593,581. An idler roll 32 may be provided at each end of the train of rolls 22 or another roll section of the type shown and described may be added at either or both ends of the supporting rolls 22.

In operation the adjusting mechanism 20 is adjusted to provide the required tightness in belt 2 and the motor 14 is started in operation to move the belt in the desired direction. Regardless of the direction of movement the belt 2 will remain centered on its supporting rolls. Movement of the belt 2 causes the rolls 22 to rotate and an object passing thereover will become centered thereon. No side guides are necessary and the object can be wider than the width of the supporting rolls 22.

While one embodiment of my invention has been shown and described it will be apparent that other adaptations and modifications may be made without departing from the scope of the following claims.

I claim:

1. A belt driven roller conveyor comprising a plurality of load supporting self-centering rolls arranged in alignment with their axes substantially parallel with one another, an endless belt adapted to contact the lower portion of said rolls, narrow-bodied head and tail pulleys for supporting said belt, each of said pulleys having a cylindrical belt supporting surface of substantially less width than the belt so that the belt can overhang the said belt supporting surface, a plurality of snubbing rolls arranged between the upper and lower runs of said belt between the load supporting rolls with their upper portion being above the lower tangent to the load supporting rolls, and a plurality of spaced apart self-centering rolls bearing against the lower run of said belt.

2. A belt driven conveyor according to claim 1 in which the snubbing rolls are self-centering rolls.

References Cited in the file of this patent

UNITED STATES PATENTS

| | | |
|---|---|---|
| 1,614,816 | York | Jan. 18, 1927 |
| 1,868,860 | Reis | July 26, 1932 |
| 2,305,730 | O'Brien et al. | Dec. 22, 1942 |
| 2,592,581 | Lorig | Apr. 15, 1952 |